United States Patent [19]

Dietz et al.

[11] Patent Number: 5,296,034

[45] Date of Patent: Mar. 22, 1994

[54] PROCESS FOR THE PRODUCTION OF COPPER PHTHALOCYANINE PIGMENT PREPARATIONS OF THE ALPHA PHASE

[75] Inventors: Erwin Dietz, Kelkheim/Taunus; Manfred Urban, Wiesbaden, both of Fed. Rep. of Germany

[73] Assignee: Hoechst Aktiengesellschaft, Frankfurt, Fed. Rep. of Germany

[21] Appl. No.: 80,472

[22] Filed: Jun. 18, 1993

[30] Foreign Application Priority Data

Jun. 18, 1992 [DE] Fed. Rep. of Germany ....... 4219950

[51] Int. Cl.$^5$ .............................................. C09B 67/50
[52] U.S. Cl. ..................... 106/412; 106/410; 106/411; 106/413; 540/122; 540/139; 540/144
[58] Field of Search ............... 106/410, 411, 412, 413; 540/122, 139, 144

[56] References Cited

U.S. PATENT DOCUMENTS

| 2,284,685 | 6/1942 | Detrick et al. ........................ 540/122 |
| 4,056,534 | 11/1977 | Schiessler et al. ................... 540/141 |
| 5,062,577 | 11/1991 | Schmitt et al. ....................... 241/171 |

FOREIGN PATENT DOCUMENTS

| 2256485 | 5/1974 | Fed. Rep. of Germany . |
| 2421804 | 12/1975 | Fed. Rep. of Germany . |
| 3716587 | 4/1988 | Fed. Rep. of Germany . |
| 1096192 | 12/1967 | United Kingdom . |
| 1422834 | 11/1972 | United Kingdom . |
| 2211509 | 5/1989 | United Kingdom . |

*Primary Examiner*—Mark L. Bell
*Assistant Examiner*—Scott L. Hertzog
*Attorney, Agent, or Firm*—Connolly and Hutz

[57] ABSTRACT

Copper phthalocyanine pigments and pigment preparations in the α phase are prepared with phase conversion from copper phthalocyanine crude pigments of the β phase in an environmentally safe and economical manner by a) first wet milling a copper phthalocyanine pigment, which is predominantly present in the β phase, in an aqueous, preferably neutral to alkaline medium in a stirred ball mill which is operated at a power density of more than 2.5 kW per liter of milling space and a peripheral speed of the stirrer of more than 12 m/s with exposure to a grinding medium having a diameter of less than 1 mm under phase-converting conditions, then b) subjecting the prepigment composition obtained by a) either b1) in the form of the mill base suspension thus obtained, or b2) after addition of an organic solvent to the mill base suspension obtained by a), or b3) in the case where the prepigment intermediate or the prepigment composition intermediate is isolated, after first taking it up in an organic solvent, to a finishing treatment at elevated temperature, and c) then isolating the resulting pigment or pigment preparation.

23 Claims, 2 Drawing Sheets

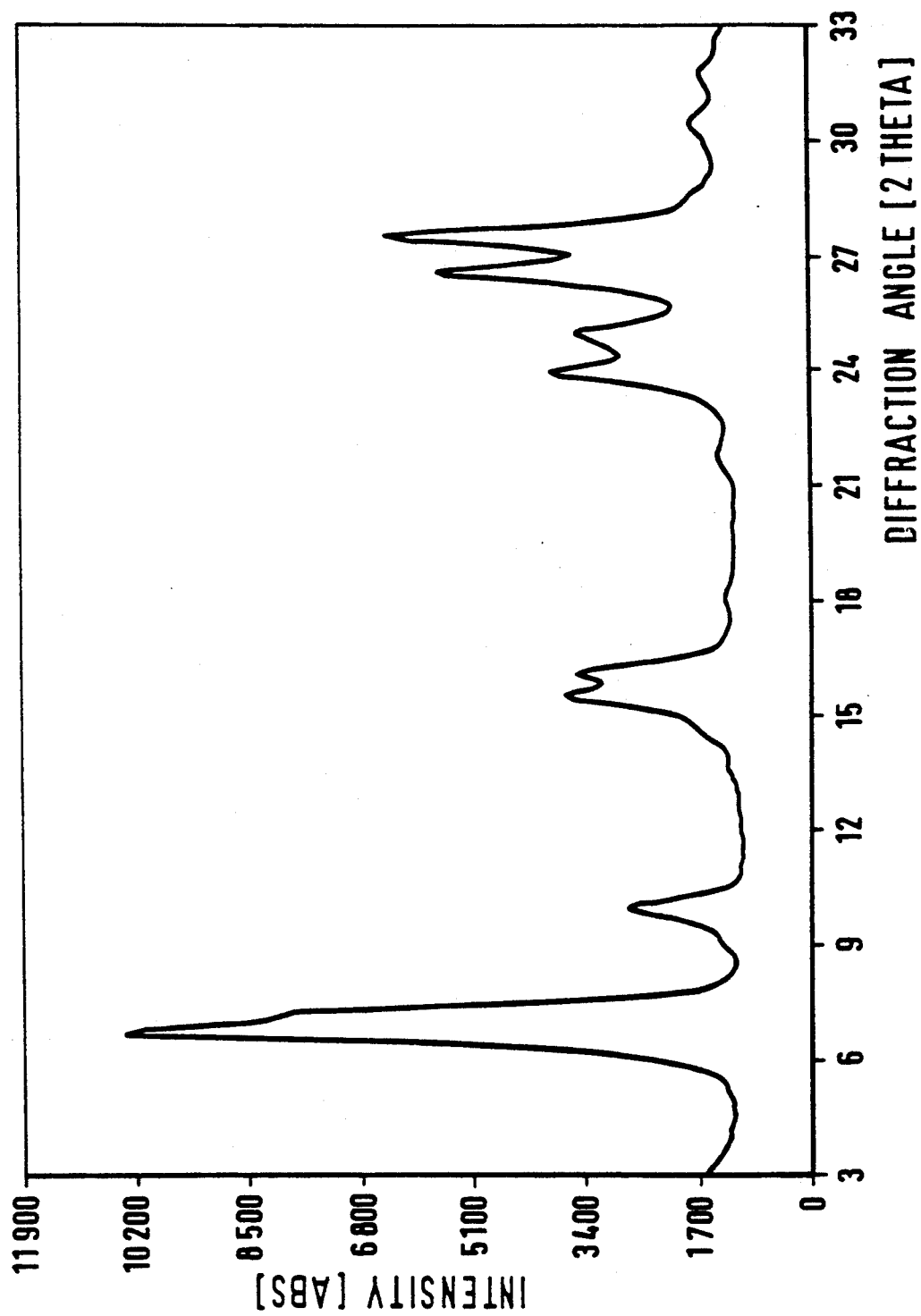

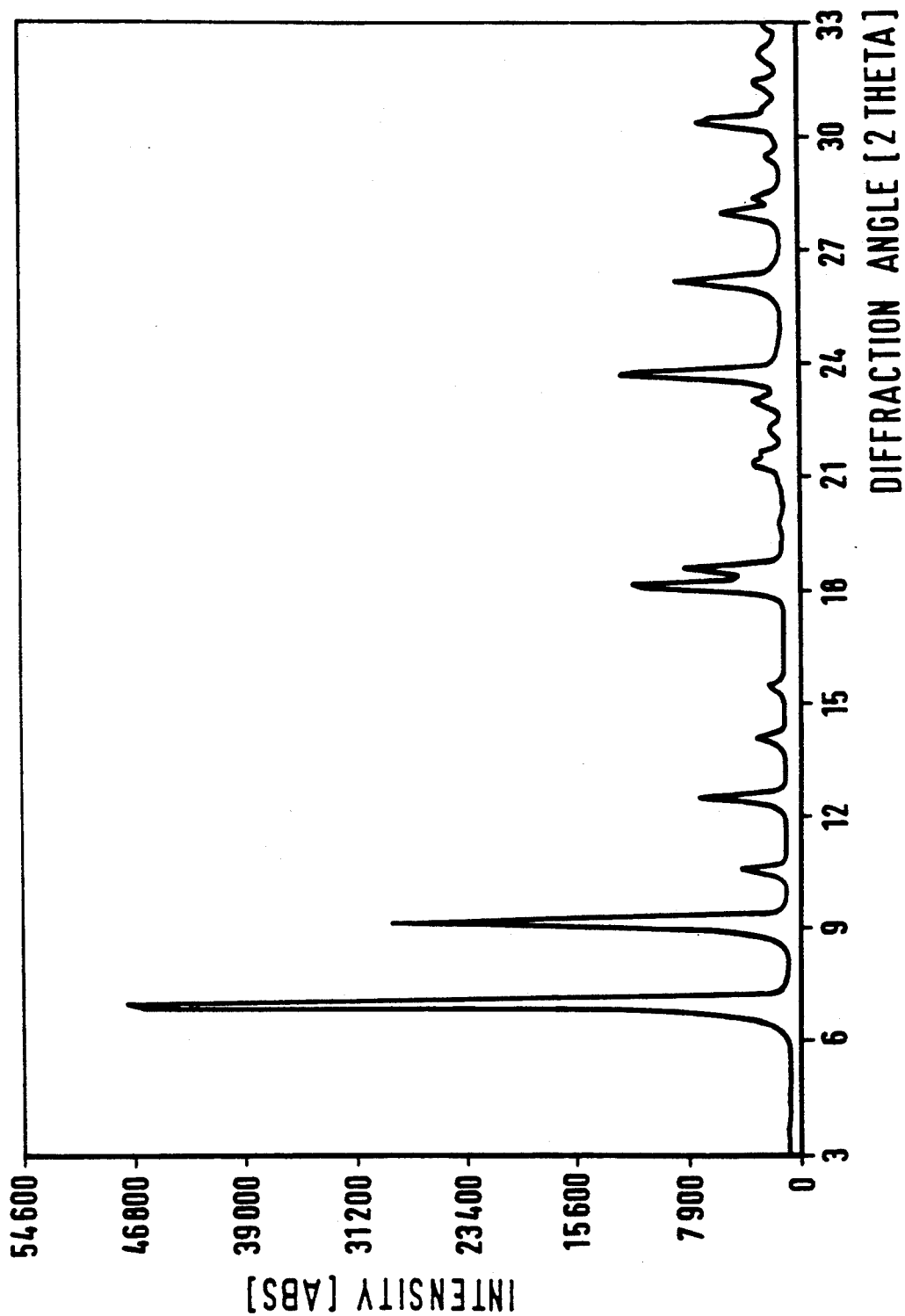

PROCESS FOR THE PRODUCTION OF COPPER PHTHALOCYANINE PIGMENT PREPARATIONS OF THE ALPHA PHASE

DESCRIPTION

The present invention is in the technical field of phthalocyanine pigments and relates to an environmentally safe and economical process for the production of pigment preparations containing copper phthalocyanine pigments of the α phase and to their use.

It is known to prepare copper phthalocyanine pigments of the α phase by dissolution of copper phthalocyanine crude pigments in concentrated sulfuric acid and subsequent precipitation of this solution in excess water or by dry milling with or without addition of salts or solvents or by aqueous bead milling. In some cases, in particular if copper phthalocyanine crude pigments of the β phase are used as the starting material, this is accompanied by phase conversion into the α phase.

U.S. Pat. No. 4,056,534 describes the preparation of copper phthalocyanine pigments of the α phase, in which a coarse-crystalline copper phthalocyanine crude pigment of the α phase is prepared by treatment with sulfuric acid, this crude pigment is milled in water and an aftertreatment in aqueous-organic medium is then carried out at elevated temperature. In this process, the large amounts of sulfuric acid resulting from purification of the crude copper phthalocyanine have to be regenerated. The pigments obtained are not suitable for use in varnishes containing aromatics, thus substantially restricting their field of application.

GB-A1 2,211,509 describes a process for the preparation of copper phthalocyanine pigments of the α phase by dry milling of copper phthalocyanine in crude pigments of the β phase and simultaneous conversion into the α phase, followed by aqueous milling of the prepigment obtained in the presence of 25% of surface-active substances, relative to the pigment. During work up, the surface-active substances enter the waste water, which must be purified by complicated treatment. Moreover, the process is expensive since dry milling and wet milling must be used.

GB-A1 1,096,192 describes an aqueous bead milling process for conversion of copper phthalocyanine crude pigments of the α phase in the presence of small amounts of surface-active agents into copper phthalocyanine pigments which substantially are present in the α phase. However, the pigments obtained no longer fulfil the requirements demanded of high-quality pigments. The α phase copper phthalocyanine pigments described are not stable in varnishes containing aromatics, thus severely restricting their use.

The pigments prepared by these known wet milling processes no longer fulfil today's quality requirements.

Accordingly, the object of the present invention was to provide a process for the production of a preparation of copper phthalocyanine pigments of the α phase which avoids the abovementioned disadvantages and produces the pigments mentioned in the α phase and in such a form that pigment preparations having excellent rheological and coloristic properties can be produced therefrom.

This object was achieved by wet milling the coarse-crystalline phthalocyanine crude pigments formed in the synthesis or purified with sulfuric acid after the synthesis, which pigments are predominantly present in the β phase, in an aqueous, preferably neutral to alkaline medium, in a stirred ball mill at a high energy density and in the presence of a fine grinding medium until a specific minimum degree of fine dispersion of the resulting pigment particles is reached, and then subjecting the mill base suspensions obtained directly or, in the case where the intermediates are isolated, after they are taken up in an inert liquid, to a customary finishing treatment, preferably in the presence of organic solvents, at elevated temperature, the pigment dispersing agents of the formula (I) defined below being added in a preferred embodiment before or during wet milling, during or after the finishing treatment or in both treatment steps mentioned.

The present invention relates to a process for the preparation of a copper phthalocyanine pigment of the α phase or a pigment preparation based on a copper phthalocyanine pigment of the α phase, which comprises a) first wet milling a copper phthalocyanine pigment, which, is predominantly present in the β phase in an aqueous, preferably neutral to alkaline, medium in a stirred ball mill which is operated at a power density of more than 2.5 kW per liter of milling space and a peripheral speed of the stirrer of more than 12 m/s with exposure to a grinding medium having a diameter of less than 1 mm under phase-converting conditions, then b) subjecting the prepigment composition obtained by a) either b1) in the form of the mill base suspension thus obtained, or b2) after addition of an organic solvent to the mill base suspension obtained by a), or b3) in the case where the prepigment intermediate or the prepigment composition intermediate is isolated, after first taking it up in an inert organic solvent, to a finishing treatment at elevated temperature, and c) then isolating the resulting pigment or pigment preparation.

Isolating is understood to mean the distilling off of the solvent, filtering and washing the press cake and then drying and milling the pigment or the pigment preparation.

In a preferred embodiment of the process according to the invention, there is added one or more times, before, during or after one or more of the individual steps a), b) and c), at least one pigment dispersing agent of the formula (I), $$P—X_m \qquad (I)$$

in which

P is an m-valent radical based on the formula (II)

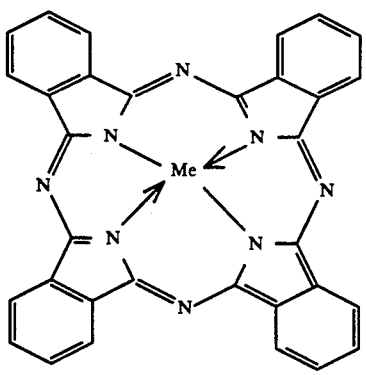

(II)

in which m is from 1 to 6,

Me is two hydrogen atoms or a divalent metal atom, preferably a copper, iron, zinc, nickel, cobalt or tin atom, in particular a copper atom, and X is a group of the formula (IIIa)

—COOM  (IIIa)

or a group of the formula (IIIb)

—SO$_3$M  (IIIb)

in which M is a hydrogen atom or an equivalent of an alkali metal ion, alkaline earth metal ion or ammonium ion or in which X is a group of the formula (IIIc)

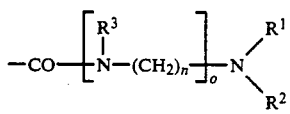  (IIIc)

or a group of the formula (IIId)

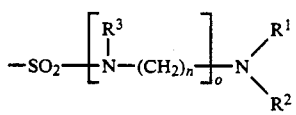  (IIId)

in which $R^1$ and $R^2$ are identical or different and are a hydrogen atom, a $C_1$–$C_{20}$-alkyl, $C_2$–$C_{20}$-alkenyl group or a $C_5$–$C_7$-cycloalkyl group, preferably a hydrogen atom, a methyl or ethyl group or in which $R^1$ and $R^2$ together with the adjacent nitrogen atom form an aliphatic or aromatic, five- to seven-membered heterocyclic system having in each case 1 to 3 identical or different heteroatoms belonging to the ring from the series comprising nitrogen, oxygen or sulfur, preferably imidazole, piperidine, piperazine, pyrrolidine, morpholine, imidazoline or hexamethyleneimine;

$R^3$ is a hydrogen atom or a $C_1$–$C_4$-alkyl group, preferably a hydrogen atom or a methyl group, n is from 1 to 6, preferably 2 or 3, o is 0 or 1, preferably 1, and m is from 1 to 4, or in which X is a aminomethylene group of the formula (IIIe)

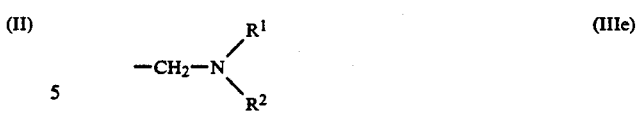  (IIIe)

in which $R^1$ and $R^2$ have the abovementioned meaning and m is from 1 to 6, or in which X is a group of the formula (IIIf)

  (IIIf)

in which A is a five- or six-membered aromatic ring or a fused aromatic heterocycle containing 1 to 3 identical or different heteroatoms from the series comprising nitrogen, oxygen or sulfur, preferably imidazole, triazole or pyrazole, and the heterocycle is bound to the methylene group via a carbon atom, $R^{30}$ and $R^4$ are a hydrogen atom, a $C_1$–$C_4$-alkyl, $C_1$–$C_4$-hydroxyalkyl or a $C_2$–$C_4$-alkenyl group, preferably a hydrogen atom, methyl, ethyl or $C_2H_4OH$, or an aryl group, aryl being phenyl which is unsubstituted or substituted by 1 to 4 radicals from the group comprising $C_1$–$C_6$-alkyl, halogen, preferably F, Cl or Br, $C_1$–$C_6$-alkoxy, cyano, $CONH_2$ and $COOR^{12}$, $R^{12}$ being hydrogen or $C_1$–$C_6$-alkyl, $R^{30}$ and $R^4$ together can also form an aliphatic or aromatic ring, preferably a phenyl ring, $R^5$ is a hydrogen atom, a $C_1$–$C_4$-alkyl, a $C_1$–$C_3$-hydroxyalkyl or a $C_2$–$C_4$-alkenyl group and m is from 1 to 4, or in which X is a group of the formula (IIIg)

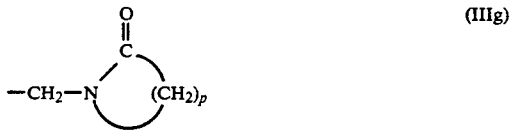  (IIIg)

p being from 3 to 6, preferably 3 to 5, and m being from to 4, or in which

X is a phthalimidomethylene group of the formula (IIIh)

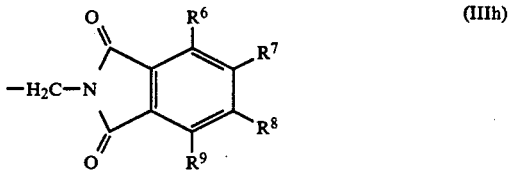  (IIIh)

in which $R^6$, $R^8$ and $R^9$ are identical or different and are a hydrogen, fluorine, chlorine or bromine atom, preferably a hydrogen atom, $R^7$ is a hydrogen, fluorine, chlorine or bromine atom or a nitro, $C_1$–$C_6$-alkyl, $C_1$–$C_6$-alkoxy or benzoylamino group, preferably a hydrogen atom, and m is from 1 to 4, or in which X is an o-sulfobenzimidomethylene group of the formula (IIIi)

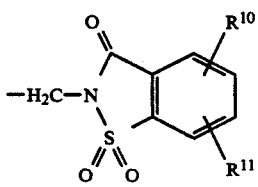

(IIIi)

in which $R^{10}$ and $R^{11}$ are identical or different and are a hydrogen, chlorine or bromine atom or a $C_1$–$C_4$-alkyl, $C_1$–$C_4$-alkoxy or a nitro group, preferably a hydrogen atom, and m is from 1 to 4, or in which X is a group of the formula (IIIk)

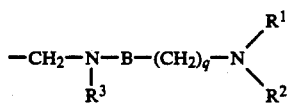

(IIIk)

in which B is a carbonyl or sulfonyl group, preferably a carbonyl group, and $R^1$, $R^2$ and $R^3$ have the abovementioned meaning, q is 1 or 2, preferably 1, and m is from 1 to 4, or there is added at least one pigment dispersing agent of the formula (I) containing variants of the above-mentioned radicals X in one molecule.

The process according to the invention for the production of these pigments or pigment preparations requires high milling efficiency, which is achieved by using a specific design of the stirred ball mill in combination with maintaining specified milling and finishing conditions. Stirred ball mills which are suitable for milling of the desired efficiency are those which are designed for batchwise and continuous operation, have a horizontally or vertically constructed milling space in the form of a cylinder or hollow cylinder and can be operated at a specific power density of more than 2.5 kW per liter of milling space and whose peripheral speed of the stirrer is more than 12 m/s. Mills which are suitable for this purpose are described, for example, in U.S. Pat. No. 5,062,577. The energy released by the stirrer per unit of time is transferred to the mill base as size reduction work and as energy of friction in the form of heat. In order to allow problem-free delivery of this large amount of heat, the ratio of milling space to surface area of the milling space (cooling area) must be minimized by the construction. This ratio should be less than 0.15:1 ($dm^3$:$dm^2$).

Examples of the grinding medium are balls made of zirconium oxide, zirconium mixed oxide, alumina or quartz having a diameter of less than 1 mm; advantageously, the grinding medium used has a diameter of 0.2 to 1 mm, preferably 0.3 to 0.5 mm.

If continuous stirred ball mills are used for fine dispersion, the grinding medium is preferably separated off from the mill base by centrifugation, so that the separation devices virtually do not come into contact with the grinding medium, thus substantially avoiding clogging of the separation devices. The stirred ball mills are operated at a high grinding medium filling ratio. In continuous stirred ball mills, the milling space is virtually completely filled with grinding medium.

Advantageously, the crude pigments of the β phase obtainable, for example, by GB-A 1,422,834 and U.S. Pat. No. 2,284,685 or the highly crystalline crude pigments of the β phase obtained after purification with sulfuric acid and converted into the β phase, which may still contain small amounts of sulfo or carboxyl groups, are used for milling. After milling process a), the copper phthalocyanine pigments used are present as finely divided prepigments.

In many cases, the α phase is unstable in the application medium, in particular if it is not stabilized. The process according to the invention makes it possible to produce a stable α phase in the application medium from a stable β phase. Depending on the physical state of the crude pigment, small amounts of alkali or surface-active agent may, if desired, be added for the phase conversion. The suitable conditions must be established by preliminary experiments.

Purity, crystal size, crystal quality and possible formations of mixed crystals are decisive for the physical state of the crude pigment. In general, pure and highly crystalline crude pigments have to be milled for a longer period than contaminated pigments and those exhibiting defects in the crystal lattice.

Milling is carried out in an aqueous or, if necessary for phase conversion, in an aqueous medium with addition of small amounts of alkali or surface-active agents in a homogeneous mixture. Milling is preferably carried out in the alkaline or neutral pH range.

In general, organic solvents adversely affect phase conversion and should be avoided. In some cases, small amounts of organic solvents have proven to be tolerable.

The pigment concentration in the mill base depends on the rheology of the suspension and is advantageously at most 40% by weight, preferably 10 to 35% by weight, in particular 10 to 20% by weight, relative to the mill base suspension.

Apart from the aqueous phase and the crude pigment, the mill base can also contain further customary pigment dispersing agents, cationic, anionic or nonionic surfactants, preferably fatty alcohol polyglycol ethers, alkylphenol polyglycol ethers, alkanesulfonic acids and their salts, alkylphenylsulfonic acids and their salts and alkylphenol polyglycol ether sulfates, rheologically active additives, and antifoams and other additives (extenders).

The milling time depends on the required fineness for the particular area of application, for example the paints, printing or plastics sector. The residence time of the mill base in the stirred ball mill depends on the required fineness and is in general between 5 and 60 minutes. This time is advantageously 5 to 45 minutes, preferably 20 to 30 minutes.

Milling is carried out at temperatures in the range from 0° to 80° C., advantageously at a temperature of between 5° and 60° C., preferably at 15° to 50° C.

Addition of the pigment dispersing agents of the formula (I) can take place all at once or in several portions. Addition can take place before, during or after milling a), during or after finishing treatment b) or during or after isolation c), in the last-mentioned case also by dry mixing. The best time for this must be determined in advance by preliminary experiments. Preferably, addition of the pigment dispersing agents takes place after milling immediately before the solvent finish.

Preference is given to pigment dispersing agents of the formula (1) in which X is a phthalimidomethylene group of the formula (IIIh), an imidazolylmethylene group of the formula (IIIf) or an o-sulfobenzimidomethylene group of the formula (IIIi).

Depending on the size of the specific surface area of the copper phthalocyanine pigment to be dispersed, the pigment dispersing agents according to the invention are added in amounts of 0.1 to 25% by weight, preferably 1 to 15% by weight, in particular 3 to 10% by weight, relative to the copper phthalocyanine pigment used. Mixtures of different pigment dispersing agents of the formula (I) also achieve the object of the present invention.

The finely divided prepigment compositions present after milling are subjected, where appropriate after addition of the pigment dispersing agents of the formula (I), in aqueous suspension or, preferably, after admixing organic solvents, to a heat treatment (solvent finish). It is also possible to dry the prepigment composition and subject it in anhydrous form or in one or more of the solvents mentioned below to a solvent finish. Examples of suitable solvents for a finish are: $C_1$-$C_{10}$-alkanols, such as methanol, ethanol, n- or isopropanol, n-, tert.- or isobutanol; $C_1$-$C_5$-dialkyl ketones, such as acetone, diethyl ketone, methyl isobutyl ketone, methyl ethyl ketone, or cyclic ketones, such as cyclohexanone; ethers or glycol ethers, for example tetrahydrofuran, dimethoxyethane, ethylene glycol monomethyl or monoethyl ether or propylene glycol monomethyl or monoethyl ether, butylglycol, ethyldiglycol or methoxybutanol; aliphatic carboxamides such as formamide or dimethylformamide; cyclic carboxylamides, such as N-methylpyrrolidone; glycol carboxylates, $C_1$-$C_4$-alkyl carboxylates, such as butyl formate, ethyl acetate or propyl propionate; $C_1$-$C_4$-alkyl phthalates and benzoates, such as ethyl benzoate; aliphatic or heterocyclic bases, such as methylamine, ethylamine, ethanolamine, diethanolamine, triethanolamine, aminopropanols, aminobutanols, pyridine, morpholine or picoline; and dimethylsulfoxide or sulfolane or mixtures of the abovementioned solvents. Preferred organic solvents are alkanols, in particular ethanol, propanol, butanols or pentanols. Butanols are particularly preferred.

The conditions to be maintained when carrying out the solvent finish are highly dependent on the desired properties of the pigment preparation and are in each case adjusted thereto. Advantageously, the suspension of the prepigment composition in the inert aqueous medium of process step a) is heated at a temperature of between 50° and 200° C., under atmospheric pressure or under elevated pressure, for 1 to 24 hours. In general, the suspension obtained after wet milling is used for this purpose without first isolating the mill base. However, it is also possible to add the abovementioned solvents, it being possible for the amount of solvent added to vary within wide limits. Preferably, the same amount by weight of solvent up to 5 times this amount, relative to the weight of the prepigment composition, is used. The heat treatment in the aqueous-organic medium is preferably carried out at 50° to 150° C. for a period of 1 to 6 hours. After finishing is complete, the solvents used therefor are recovered and used again.

By selecting the organic solvent, its concentration, the temperature and the duration of the finishing treatment, it is possible to produce, depending on the intended use, copper phthalocyanine pigment preparations which have either higher transparency or hiding power.

The production of pigments or pigment preparations based on copper phthalocyanines by the process according to the invention has proven to be particularly economical and environmentally safe since the fine dispersion of the crude pigments by wet milling does not give rise to air pollution as a result of dust formation. Furthermore, only small amounts of the abovementioned additives and solvents are used, which are then further processed or can be completely regenerated so that no waste disposal problems arise.

The pigment preparations obtainable by the present invention are distinguished by their excellent coloristic and rheological properties, in particular resistance to flocculation, dispersibility, rheology, gloss characteristics, reddish shade and color strength and very particularly by their phase stability towards aromatic solvents, i.e., the copper phthalocyanine pigments converted by the process according to the invention from the $\beta$ phase into the $\alpha$ phase remain in the application medium to the widest possible extent in the $\alpha$ phase even in the presence of aromatic solvents.

The present invention furthermore relates to pigment preparations obtainable by the process according to the invention described above.

The pigment preparations produced according to the invention can be used for the pigmenting of high-molecular-weight organic materials of natural or synthetic origin:

Examples of high-molecular-weight organic materials which can be pigmented with the pigment preparations mentioned are cellulose ethers and cellulose esters, such as ethylcellulose, nitrocellulose, cellulose acetate or cellulose butyrate, natural resins or synthetic resins, such as polymerization resins or condensation resins, for example amino resins, in particular urea/and melamine/formaldehyde resins, alkyd resins, acrylic resins, phenolic resins, polycarbonates, polyolefins, such as polystyrene, polyvinyl chloride, polyethylene, polypropylene, polyacrylonitrile, polyacrylic esters, polyamides, polyurethanes or polyesters, rubber, casein, silicone and silicone resins, individually or in mixtures.

It is of no importance whether the high-molecular-weight organic compounds mentioned are present as plastic compositions, melts or in the form of spinning solutions, paints, coating compositions or printing inks. Depending on the intended use, it may be advantageous to use the pigment preparations obtained according to the invention as toners or in the form of preparations or dispersions. Pigment preparations produced according to the invention are used in an amount of 0.1 to 10% by weight, relative to the high-molecular-weight organic material to be pigmented.

Particularly preferred coating systems are the modern, aqueous paints and the low-solvent high-solid paints of high solids content. Customary coating systems from the class comprising alkyd/melamine varnishes and two-component finishes based on acrylic resins crosslinkable with polyisocyanate are also suitable.

Pigment preparations produced according to the invention are readily dispersible in many application media and to a high degree of fineness. Such pigment dispersions have high resistance to flocculation and exhibit phase stability and excellent rheological properties even when highly pigmented. They provide coatings and prints of high color strength, high gloss and high transparency and excellent fastness properties.

In order to evaluate the properties of the pigment preparations produced according to the invention in the coating sector, an alkyd/melamine (AM) varnish containing aromatics and based on a medium-oil, non-drying alkyd resin obtained from synthetic fatty acids and phthalic anhydride and a melamine resin etherified with butanol and portions of a non-drying alkyd resin based on ricinoleic acid (short-oil), a high-solid acrylic baking enamel based on a non-aqueous dispersion (TSA) and an aqueous varnish with a dispersing resin based on polyurethane (PUR) were selected from the multiplicity of known varnishes.

In order to evaluate the properties of pigment preparations produced by the present invention in the plastics sector, plasticized polyvinyl chloride (PVC) was selected from the multiplicity of known plastics.

In order to evaluate the properties of the pigment preparations produced by the present invention in printing technology, a gravure printing system based on nitrocellulose (NC) was selected from the multiplicity of known printing systems.

Color strength and shade were determined according to DIN 55986. The rheology of the mill base after dispersion was scored against the following five-step scale:
5: thin liquid
4: liquid
3: viscous liquid
2: slightly solid
1: solidified After diluting the mill base to the final pigment concentration, the viscosity was evaluated using a Rossmann viscous batch, type 301, from Erichsen, Iserlohn.

Gloss measurements were carried out on cast films at an angle of 20° by DIN 67 530 (ASTMD 523) using the "multi-gloss" meter from Byk-Mallinckrodt, Wesel.

The pigment content of the copper phthalocyanine crude pigments was determined by dissolution in concentrated sulfuric acid and reprecipitation.

The crystal phase of the crude pigments, pigments and pigment preparations was determined by x-ray spectroscopy. The x-ray spectra were recorded using Cu $K_\alpha$ radiation.

The crystal phase of the pigments and pigment preparations in the application media was determined by spectralphotometry.

FIG. 1 shows the x-ray diffraction spectrum of a copper phthalocyanine pigment of the $\alpha$ phase still containing 2.2% of the $\beta$ phase.

FIG. 2 shows the x-ray diffraction spectrum of a coarse-crystalline copper phthalocyanine crude pigment, 95.5% of which is present in the $\beta$ phase.

In the examples which follow, parts and percentages of the substances described are by weight.

EXAMPLE 1

A suspension comprising 85 parts of 1% sodium hydroxide solution and 15 parts of coarse-crystalline copper phthalocyanine crude pigment ($\beta$ phase, 95.5% pure) is metered into a stirred ball mill of the design described in U.S. Pat. No. 5,062,577 which is filled with 336 parts of zirconium mixed oxide beads 0.3 to 0.4 mm in diameter as a grinding medium, and the mixture is milled at 25° C. and a peripheral speed of the stirrer of 15.6 m/s and a specific power density of 3.1 kW per liter of milling space for 30 minutes. The mill base suspension is then separated from the grinding medium, the grinding medium is rinsed with 210 parts of water, and the mill base suspensions are combined.

1.5 parts of the pigment dispersing agent of the formula (I) are added to this mill base suspension as a 16.0% water-moist press cake. In this formula (I), P is the radical given in formula (II) in which Me is a copper atom and in which X is a phthalimidomethylene group of the formula (IIIh) in which $R^6$, $R^7$, $R^8$ and $R^9$ are each a hydrogen atom and m is 1.0. 45 parts of isobutanol (100% pure) are then added, and the mixture is stirred at 25° C. for 24 hours. It is heated to boiling, stirred at the boiling temperature for 3 hours, and the isobutanol is then distilled off azeotropically by heating to up to 100° C. at the head. After cooling to 60° C., the pigment preparation is filtered off with suction, washed with water and dried at 80° C.

This gives 14.6 parts of pigment preparation ($\alpha$ phase, containing 3.0% of $\beta$ phase), which on incorporation in AM varnish produces coatings of high color strength. The rheology is given a rating of 2 to 3. The viscosity is 16.3 s, and the gloss measurement gives a value of 80.

In the coating, the pigment is present in the same phase composition.

EXAMPLE 2

A suspension comprising 85 parts of water and 15 parts of z coarse-crystalline copper phthalocyanine crude pigment ($\beta$ phase, 95.5% pure, see FIG. 2) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 30 minutes. The mill base suspension is then separated from the grinding medium, the grinding medium is rinsed with water, and the combined mill base suspensions are filtered off with suction.

For the finishing operation, the press cake obtained on the filter is taken up in 120 parts of water, and 1.5 parts of the pigment dispersing agent of the formula (I) are added as a 16.0% water-moist press cake. In formula (I), P is the radical given in formula (II) in which Me is a copper atom and in which X is a phthalimidomethylene group of the formula (IIIh) in which $R^6$, $R^7$, $R^8$ and $R^9$ are each a hydrogen atom and m is 1.0. 45 parts of isobutanol (100% pure) are then added, the mixture is stirred at the boiling temperature for 3 hours, and the isobutanol is then distilled off azeotropically by heating to up to 100° C. at the head. After cooling to 60° C., the pigment preparation is filtered off with suction, washed with water and dried at 80° C.

This gives 14.8 parts of pigment preparation ($\alpha$ phase, containing 2.2% of phase, see FIG. 1), which on incorporation in AM varnish produces coatings of high color strength. The rheology is given a rating of 2 to 3. The viscosity is 18.6 s, and the gloss measurement gives a value of 80. In the coating, the pigment preparation is present in the same phase composition.

COMPARATIVE EXAMPLE 2a

If the crude pigment used in Examples 1 and 2 is milled by the procedure of GB-A-1,096,192 and then finished as described above, a pigment is obtained which predominantly is present in the $\beta$ phase and on incorporation in AM varnish has a 21% lower color strength than the pigment preparation produced according to the invention.

EXAMPLE 3

A suspension comprising 85 parts of water and 15 parts of coarse-crystalline copper phthalocyanine crude pigment ($\beta$ phase, 95.5% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 5° to 10° C. and a peripheral speed of the stirrer of 15.6 m/s at a specific power density of 3.1 kW per liter of milling space for 30 minutes. The mill base suspension is then separated from the grinding medium, the grinding medium is rinsed with water, and the combined mill base suspensions are filtered off with suction.

For the finishing operation, the press cake obtained on the filter is taken up in 120 parts of water, and 1.5 parts of the pigment dispersing agent of the formula (I) are added as a 16.0% water-moist press cake. In formula (I), P is the radical given in formula (II) in which Me is a copper atom and in which X is a phthalimidomethylene group of the formula (IIIh) in which $R^6$, $R^7$, $R^8$ and $R^9$ are each a hydrogen atom and m is 1.0. 45 parts of isobutanol (100% pure) are then added, the mixture is stirred at the boiling temperature for 3 hours, and the isobutanol is then distilled off azeotropically by heating to up to 100° C. at the head. After cooling to 60° C., the pigment preparation is filtered off with suction, washed with water and dried at 80° C.

This gives 14.4 parts of pigment preparation ($\alpha$ phase containing 3.4% of $\beta$ phase) which on incorporation in AM varnish produces coatings of high color strength.

EXAMPLE 4

A suspension comprising 85 parts of water and 15 parts of coarse-crystalline copper phthalocyanine crude pigment ($\beta$ phase, 95.5% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 30 minutes. The mill base suspension is then separated from the grinding medium and the grinding medium is rinsed with water. The combined mill base suspensions are filtered off with suction. The press cake obtained in which 99% of the pigment is present in the a phase is stirred with 80 parts of water and 4.5 parts of 100% isobutanol and milled again under the abovementioned conditions. The mill base suspension is then separated off from the grinding medium, and the grinding medium is rinsed with water. The combined mill base suspensions are filtered off with suction.

For the finishing operation, the press cake obtained on the filter is taken up in 120 parts of water, and 1.5 parts of the pigment dispersing agent of the formula (I) are added as a 16.0% water-moist press cake. In formula (I), P is the radical given in formula (II) in which Me is a copper atom and in which X is a phthalimidomethylene group of the formula (IIIh) in which $R^6$, $R^7$, $R^8$ and $R^9$ are each a hydrogen atom and m is 1.0. 45 parts of isobutanol (100% pure) are then added, the mixture is stirred at the boiling temperature for 3 hours, and the isobutanol is then distilled off azeotropically by heating to up to 100° C. at the head. After cooling to 60° C., the pigment preparation is filtered off with suction, washed with water and dried at 80° C.

This gives 14.3 parts of pigment preparation ($\alpha$ phase which contains less than 1% of $\beta$ phase) which on incorporation in AM varnish produces coatings of high color strength. In the coating, the pigment is present in the same phase composition.

EXAMPLE 5

A suspension comprising 85 parts of 5% aqueous isobutanol and 15 parts of coarse-crystalline copper phthalocyanine crude pigment ($\beta$ phase, 95.5% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 30 minutes. The mill base suspension is then separated from the grinding medium and the grinding medium is rinsed with water. The combined mill base suspensions are filtered off with suction. The press cake obtained in which 100% of the pigment is present in the $\beta$ phase is stirred with 80 parts of water and milled again under the abovementioned conditions. The mill base suspension is then separated off from the grinding medium, and the grinding medium is rinsed with water. The combined mill base suspensions are filtered off with suction.

For the finishing operation, the press cake obtained on the filter is taken up in 120 parts of water, and 1.5 parts of the pigment dispersing agent of the formula (I) are added as a 16.0% water-moist press cake. In formula (I), P is the radical given in formula (II) in which Me is a copper atom and in which X is a phthalimidomethylene group of the formula (IIIh) in which $R^6$, $R^7$, $R^8$ and $R^9$ are each a hydrogen atom and m is 1.0. 45 parts of isobutanol (100% pure) are then added, the mixture is stirred at the boiling temperature for 3 hours, and the isobutanol is then distilled off azeotropically by heating to up to 100° C. at the head. After cooling to 60° C., the pigment preparation is filtered off with suction, washed with water and dried at 80° C.

This gives 14.8 parts of pigment preparation ($\alpha$ phase which contains less than 1% of $\beta$ phase) which on incorporation in AM produces coatings of high color strength. In the coating, the pigment preparation is present in the same phase composition.

EXAMPLE 6

A suspension comprising 90 parts of water and 10 parts of coarse-crystalline copper phthalocyanine crude pigment (comprising 70% of $\alpha$ phase and 30% of $\beta$ phase, 91.5% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 20 minutes. The mill base suspension is then separated from the grinding medium, the grinding medium is rinsed with water, and the combined mill base suspensions are filtered off with suction.

For the finishing operation, the filter cake is taken up in 80 parts of water, and 0.9 part of the pigment dispersing agent of the formula (I) is added as a 16.0% water-moist press cake. In formula (I), P is the radical given in formula (II) in which Me is a copper atom and X is the phthalimidomethylene group of the formula (IIIh) in which $R^6$, $R^7$, $R^8$ and $R^9$ are each a hydrogen atom and m is 1.0. 9 parts of 40% methylamine are then added and the mixture is stirred at the boiling temperature for 3 hours. The methylamine is then distilled off by heating to up to 100° C. at the head. After cooling to 60° C., the pigment preparation is filtered off with suction, washed with water and dried at 80° C.

This gives 10.1 parts of pigment preparation ($\alpha$ phase containing 7.0% of $\beta$ phase) which on incorporation in AM varnish produces coatings of high color strength.

EXAMPLE 7

A suspension comprising 85 parts of water and 15 parts of coarse-crystalline copper phthalocyanine crude pigment ($\beta$ phase, 95.5% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 30 minutes. The mill base suspension is then separated from the grinding medium, the grinding medium is rinsed with water, and the combined mill base suspensions are filtered off with suction.

For the finishing operation, the press cake obtained on the filter is taken up in 120 parts of water, and 1.5 parts of the pigment dispersing agent of the formula (I) are added as a 16.0% water-moist press cake. In formula (I), P is the radical given in formula (II) in which Me is a copper atom and in which X is a phthalimidomethylene group of the formula (IIIh) in which $R^6$, $R^7$, $R^8$ and $R^9$ are each a hydrogen atom and m is 1.0. 15 parts of ethanolamine are then added and the mixture is stirred at the boiling temperature for 3 hours. After cooling to 60° C., the pigment preparation is filtered off with suction, washed with water and dried at 80° C.

This gives 15.7 parts of pigment preparation ($\alpha$ phase containing 2.2% of $\beta$ phase) which on incorporation in AM varnish produces coatings of high color strength. When used for nitrocellulose gravure printing, prints of high color strength are obtained.

EXAMPLE 8

A suspension comprising 85 parts of 1% aqueous isobutanol and 15 parts of coarse-crystalline copper phthalocyanine crude pigment ($\beta$ phase, 95.5% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 30 minutes. The mill base suspension is then separated from the grinding medium, the grinding medium is rinsed with water, and the combined mill base suspensions are filtered off with suction.

For the finishing operation, the press cake obtained on the filter is taken up in 120 parts of water, and 1.5 parts of the pigment dispersing agent of the formula (I) are added as a 16.0% water-moist press cake. In formula (I), P is the radical given in formula (II) in which Me is a copper atom and in which X is a phthalimidomethylene group of the formula (IIIh) in which $R^6$, $R^7$, $R^8$ and $R^9$ are each a hydrogen atom and m is 1.0. 45 parts of isobutanol (100% pure) are then added, the mixture is stirred at the boiling temperature for 3 hours, and the isobutanol is then distilled off azeotropically by heating to up to 100° C. at the head. After cooling to 60° C., the pigment preparation is filtered off with suction, washed with water and dried at 80° C.

This gives 14.8 parts of pigment preparation ($\alpha$ phase containing 2.5% of $\beta$ phase) which on incorporation in AM varnish produces coatings of high color strength.

EXAMPLE 9

A suspension comprising 90 parts of water and 10 parts of coarse-crystalline copper phthalocyanine crude pigment ($\beta$ phase, 94.9% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 20 minutes. The mill base suspension is then separated from the grinding medium, the grinding medium is rinsed with water, and the combined mill base suspensions are filtered off with suction.

For the finishing operation, the press cake obtained on the filter is taken up in 80 parts of water, and 1.0 part of the pigment dispersing agent of the formula (I) is added as a 16.0% water-moist press cake. In formula (I), P is the radical given in formula (II) in which Me is a copper atom and in which X is a group of the formula (IIIf) in which A is an imidazolyl radical, $R^{10}$ is a methyl group, $R^4$ and $R^5$ are each a hydrogen atom and m is 1.0. The pigment dispersing agent still contains 40% of unsubstituted copper phthalocyanine. 10 parts of 40% methylamine in water are then added and the mixture is stirred at the boiling temperature for 3 hours. The methylamine is then distilled off by heating to up to 100° C. at the head. After cooling to 60° C., the pigment preparation is filtered off with suction, washed with water and dried at 80° C.

This gives 9.9 parts of pigment preparation phase containing 7.0% of $\beta$ phase) which on incorporation in AM varnish produces coatings of high color strength.

EXAMPLE 10

A suspension comprising 85 parts of water and 15 parts of coarse-crystalline copper phthalocyanine crude pigment ($\beta$ phase, 99.0% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 30 minutes. The mill base suspension is then separated from the grinding medium, the grinding medium is rinsed with water, and the combined mill base suspensions are filtered off with suction.

For the finishing operation, the press cake obtained on the filter is taken up in 120 parts of water, and 1.5 parts of the pigment dispersing agent of the formula (I) are added as a 16.0% water-moist press cake. In formula (I), P is the radical given in formula (II) in which Me is a copper atom and in which X is a phthalimidomethylene group of the formula (IIIh) in which $R^6$, $R^7$, $R^8$ and $R^9$ are each a hydrogen atom and m is 1.0. 45 parts of isobutanol (100% pure) are then added, the mixture is stirred at the boiling temperature for 3 hours, and the isobutanol is then distilled off azeotropically by heating to up to 100° C. at the head. After cooling to 60° C., the pigment preparation is filtered off with suction, washed with water and dried at 80° C.

This gives 14.7 parts of pigment preparation (α phase containing 9.2% of β phase) which on incorporation in AM varnish produces coatings of high color strength.

EXAMPLE 11

A suspension comprising 85 parts of 1% sodium hydroxide solution and 15 parts of coarse-crystalline copper phthalocyanine crude pigment phase 95.5% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 30 minutes. The mill base suspension is then separated from the grinding medium, the grinding medium is rinsed with water, and the combined mill base suspensions are filtered off with suction.

For the finishing operation, the press cake obtained on the filter is taken up in 120 parts of water, and 0.75 part of the pigment dispersing agent of the formula (I) in which P is the radical given in formula (II) and in which Me is a copper atom, X is an o-sulfobenzimidomethylene group of the formula (IIIi), $R^{10}$ and $R^{11}$ are each a hydrogen atom and m is 1.0 and which still contains 50% of unsubstituted copper phthalocyanine, is added as a 19.4% water-moist press cake. 45 parts of isobutanol (100% pure) are added and the mixture is stirred at 25° C. for 24 hours. The mixture is heated to the boil and stirred at the boil for 3 hours and the isobutanol is then distilled off azeotropically by heating to up to 100° C. at the head. After cooling to 60° C., the pigment preparation is filtered off with suction, washed with water and dried at 80° C.

This gives 14.6 parts of pigment preparation (α phase containing 2.2% of β phase) which on incorporation in PUR varnish produces coatings of high color strength. The rheology is given a rating of 5. The viscosity is 2.8 s, and the gloss measurement gives a value of 86. Incorporation in PVC gives colorations of high color strength.

EXAMPLE 12

A suspension comprising 85 parts of water and 15 parts of coarse-crystalline copper phthalocyanine crude pigment (β phase, 95.5% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 30 minutes. The mill base suspension is then separated from the grinding medium, the grinding medium is rinsed with water, and the combined mill base suspensions are filtered off with suction.

For the finishing operation, the press cake obtained on the filter is taken up in 120 parts of water. 45 parts of isobutanol (100% pure) are then added and the mixture is stirred at the boiling temperature for 3 hours. The isobutanol is then distilled off azeotropically by heating to up to 100° C. at the head. After cooling to 60° C., the pigment is filtered off with suction, washed with water and dried at 80° C.

This gives 14.8 parts of pigment preparation (α phase containing 4.6% of β phase).

9.0 parts of the pigment are mechanically mixed with 1.0 part of the pigment dispersing agent of the formula (I). In formula (I), P is the radical given in formula (II) in which Me is a copper atom and in which X is the group of the formula (IIIf) in which A is an imidazolyl radical, $R^{10}$ is a methyl group, $R^4$ and $R^5$ are each a hydrogen atom and m is 1.0. The pigment dispersing agent still contains 0% of unsubstituted copper phthalocyanine.

This gives a pigment preparation which on incorporation in TSA varnish produces coatings of high color strength.

EXAMPLE 13

A suspension comprising 90 parts of water and 10 parts of coarse-crystalline copper phthalocyanine crude pigment (β phase, 94.9% pure) is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 60 minutes. The mill base suspension is then separated from the grinding medium, the grinding medium is rinsed with water, and the combined mill base suspensions are filtered off with suction.

For the finishing operation, the press cake obtained on the filter is taken up in 80 parts of water, and 1.0 part of the pigment dispersing agent of the formula (I) is added as a 16.0% water-moist press cake. In formula (I), P is the radical given in formula (II) in which Me is a copper atom and in which X is a group of the formula (IIIf) in which A is an imidazolyl radical, $R^{30}$ is a methyl group, $R^4$ and $R^5$ are each a hydrogen atom and m is 1.0. The pigment dispersing agent still contains 40% of unsubstituted copper phthalocyanine. The mixture is stirred for 1 hour, filtered off with suction and dried at 80° C. This gives 10.9 parts of prepigment preparation. It is taken up in 100 parts of ethylglycol, and the mixture is stirred at 135° C. for 5 hours. After cooling to 60° C., the pigment preparation is filtered off with suction, washed with ethanol and dried at 80° C.

This gives 10.3 parts of pigment preparation (α phase not containing any α phase) which on incorporation in AM varnish produces coatings of high color strength.

EXAMPLE 14

A suspension comprising 85 parts of water, 15 parts of coarse-crystalline copper phthalocyanine crude pigment (β phase, 95.5% pure) and 1.5 parts of dodecylbenzenesulfonic acid is metered into a stirred ball mill (manufacturer: Draiswerke GmbH, Mannheim) which is filled with 336 parts of zirconium mixed oxide beads 0.3 to 0.4 mm in diameter as the grinding medium, and the mixture is milled at 25° C. and a peripheral speed of the stirrer of 15.6 m/s at a specific power density of 3.1 kW per liter of milling space for 30 minutes. The mill base suspension is then separated from the grinding medium, the grinding medium is rinsed with water, and the combined mill base suspensions are filtered off with suction.

For the finishing operation, the press cake obtained on the filter is taken up in 120 parts of water, and 3.0 parts of the pigment dispersing agent of the formula (I) are added as a 16.0% water-moist press cake. In formula (I), P is the radical given in formula (II) in which Me is a copper atom and in which X is a phthalimidomethylene group of the formula (IIIh) in which $R^6$, $R^7$, $R^8$ and $R^9$ are each a hydrogen atom and m is 1.0. 45 parts of isobutanol (100% pure) are then added, the mixture is stirred at the boiling temperature for 3 hours, and the isobutanol is then distilled off azeotropically by heating to up to 100° C. at the head. After cooling to 60° C., the pigment preparation is filtered off with suction, washed with water and dried at 80° C.

This gives 15.9 parts of pigment preparation (α phase containing 1.7% of β phase) which on incorporation in AM varnish produces coatings of high color strength.

What is claimed is:

1. A process for the preparation of a copper phthalocyanine pigment of the α phase or a pigment preparation based on a copper phthalocyanine pigment of the α phase, which comprises
   a) first wet milling a crude copper phthalocyanine pigment, which is predominantly present in the phase in an aqueous medium in a stirred ball mill which is operated at a power density of more than 2.5 kW per liter of milling space and a peripheral speed of the stirrer of more than 12 m/s with exposure to a grinding medium having a diameter of less than 1 mm under phase-converting conditions, thus producing a prepigment composition, then
   b) subjecting the prepigment composition obtained by a) either
      b1) in the form of the mill base suspension thus obtained, or
      b2) after addition of an organic solvent to the mill base suspension obtained by a), or
      b3) in the case where the prepigment intermediate or the prepigment composition intermediate is isolated, after first taking it up in an inert organic solvent,
   to a finishing treatment at elevated temperature, and
   c) then isolating the resulting pigment or pigment preparation.

2. The process as claimed in claim 1, wherein there is added one or more times, before, during or after one or more of the individual steps a), b) and c), at least one pigment dispersing agent of the formula (I), $$P-X_m \quad (I)$$

in which
P is an m-valent radical based on the formula (II)

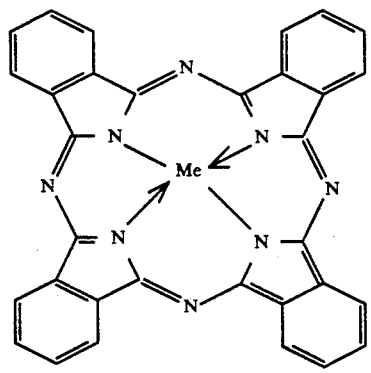

(II)

in which
m is from 1 to 6,
Me is two hydrogen atoms or a divalent metal atom, and
X is a group of the formula (IIIa)

—COOM    (IIIa)

or a group of the formula (IIIb)

—SO$_3$M    (IIIb)

in which M is a hydrogen atom or an equivalent of an alkali metal ion, alkaline earth metal ion or ammonium ion or in which
X is a group of the formula (IIIc)

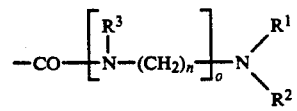

(IIIc)

or a group of the formula (IIId)

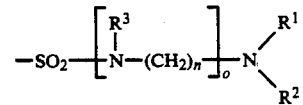

(IIId)

in which R$^1$ and R$^2$ are identical or different and are a hydrogen atom, a C$_1$-C$_{20}$-alkyl, C$_2$-C$_{20}$-alkenyl group or a C$_5$-C$_7$-cycloalkyl group, or in which R$^1$ and R$^2$ together with the adjacent nitrogen atom form an aliphatic or aromatic, five- to seven-membered heterocyclic system having in each case 1 to 3 identical or different heteroatoms belonging to the ring selected from the series consisting of nitrogen, oxygen and sulfur,
R$^3$ is a hydrogen atom or a C$_1$-C$_4$-alkyl group,
n is from 1 to 6,
o is 0 or 1, and
m is from 1 to 4, or in which
x is an aminomethylene group of the formula (IIIe)

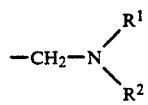

(IIIe)

in which R$^1$ and R$^2$ have the abovementioned meaning and m is from 1 to 6, or in which
X is a group of the formula (IIIf)

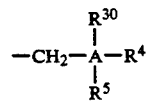

(IIIf)

in which A is a five- or six-membered aromatic ring or a fused aromatic heterocycle containing 1 to 3 identical or different heteroatoms selected from the series consisting of nitrogen, oxygen and sulfur, and the heterocycle is bound to the methylene group via a carbon atom,
R$^{30}$ and R$^4$ are a hydrogen atom, a C$_1$-C$_4$-alkyl, C$_1$-C$_4$-hydroxyalkyl or a C$_2$-C$_4$-alkenyl group or C$_2$H$_4$OH or an aryl group, aryl being phenyl which is unsubstituted or substituted by 1 to 4 radicals selected from the group consisting of C$_1$-C$_6$-alkyl, halogen, C$_1$-C$_6$-alkoxy, cyano, CONH$_2$ and COOR$^{12}$, R$^{12}$ being hydrogen or C$_1$-C$_6$-alkyl, $R^{30}$ and $R^4$ together can also form an aliphatic or aromatic ring, $R^5$ is a hydrogen atom, a $C_1$-$C_4$-alkyl, a $C_1$-$C_3$-hydroxyalkyl or a $C_2$-$C_4$-alkenyl group and m is from 1 to 4, or in which X is a group of the formula (IIIg)

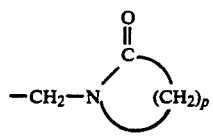 (IIIg)

p being from 3 to 6 and m being from 1 to 4, or in which

X is a phthalimidomethylene group of the formula (IIIh)

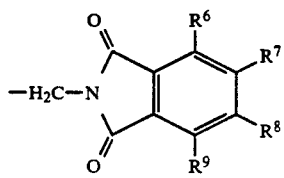 (IIIh)

in which $R^6$, $R^8$ and $R^9$ are identical or different and are a hydrogen, fluorine, chlorine or bromine atom, $R^7$ is hydrogen, fluorine, chlorine or bromine atom or a nitro, $C_1$-$C_6$-alkoxy or benzoylamino group, and m is from 1 to 4, or in which X is an o-sulfobenzimidomethylene group of the formula (IIIi)

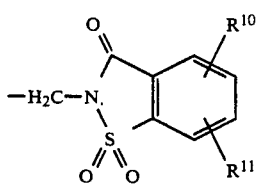 (IIIi)

in which $R^{10}$ and $R^{11}$ are identical or different and are a hydrogen, chlorine or bromine atom or a $C_1$-$C_4$-alkyl, $C_1$-$C_4$-alkoxy or a nitro group, and m is from 1 to 4, or in which X is a group of the formula (IIIk)

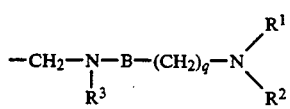 (IIIk)

in which B is a carbonyl or sulfonyl group, and $R^1$, $R^2$ and $R^3$ have the abovementioned meaning, q is 1 or 2, and m is from 1 to 4, or there is added at least one pigment dispersing agent of the formula (I) containing variants of the abovementioned radical X in one molecule.

3. The process as claimed in claim 1, wherein there is added one or more times, before, during or after one or more of the individual steps a), b) and c), at least one pigment dispersing agent of the formula (I), $$P-X_m \qquad (I)$$

in which

P is an m-valent radical based on the formula (II)

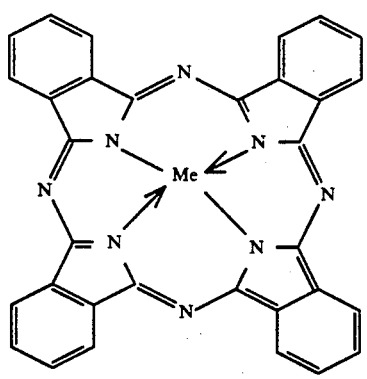 (II)

in which m is from 1 to 6,

Me is two hydrogen atoms or a copper, iron, zinc, nickel, cobalt or tin atom, and X is a group of the formula (IIIa)

$$-COOM \qquad (IIIa)$$

or a group of the formula (IIIb)

$$-SO_3M \qquad (IIIb)$$

in which M is a hydrogen atom or an equivalent of an alkali metal ion, alkaline earth metal ion or ammonium ion or in which X is a group of the formula (IIIc)

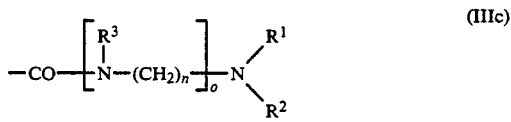 (IIIc)

or a group of the formula (IIId)

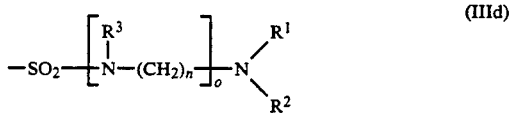 (IIId)

in which $R^1$ and $R^2$ are identical or different and are a hydrogen atom, a methyl or ethyl group or in which $R^1$ and $R^2$ together with the adjacent nitrogen atom from an imidazole, piperidine, piperazine, pyrrolidine, morpholine, imidazoline or hexamethylene ring, $R^3$ is a hydrogen atom or a methyl group n is 2 or 3, o is 1 and m is from 1 to 4, or in which X is an aminomethylene group of the formula (IIIe)

 (IIIe)

in which $R^1$ and $R^2$ have the abovementioned meaning and m is from 1 to 6, or in which
X is a group of the formula (IIIf)

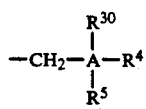

in which A is an imidazole, triazole or pyrazole ring and said heterocycle is bound to the methylene group via a carbon atom,
$R^{30}$ and $R^4$ are a hydrogen atom, methyl, ethyl or $C_2H_4OH$ or an aryl group, aryl being phenyl which is unsubstituted or substituted by 1 to 4 radicals selected from the group consisting of $C_1$-$C_6$-alkyl, F, Cl, Br, $C_1$-$C_6$-alkoxy, cyano, $CONH_2$ and $COOR^{12}$, $R^{12}$ being hydrogen or $C_1$-$C_6$-alkyl,
$R^{30}$ and $R^4$ together optionally form an aliphatic or a phenyl ring,
$R^5$ is a hydrogen atom, a $C_1$-$C_4$-alkyl, a $C_1$-$C_3$-hydroxyalkyl or a $C_2$-$C_4$-alkenyl group and
m is from 1 to 4, or in which
X is a group of the formula (IIIg)

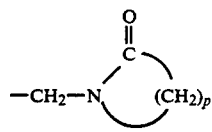

p being from 3 to 5 and m being from 1 to 4, or in which
X is a phthalimidomethylene group of the formula (IIIh)

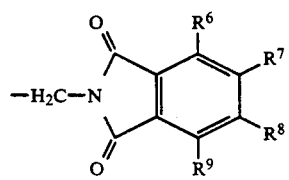

in which $R^6$, $R^7$, $R^8$ and $R^9$ are hydrogen atoms, and
m is from 1 to 4, or in which
X is an o-sulfobenzimidomethylene group of the formula (IIIi)

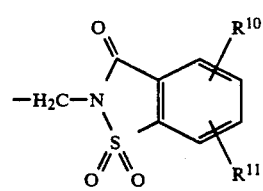

in which $R^{10}$ and $R^{11}$ are a hydrogen atom and
m is from 1 to 4, or in which
X is a group of the formula (IIIk)

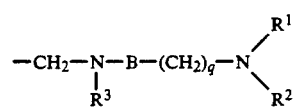

in which B is a carbonyl group, and $R^1$, $R^2$ and $R^3$ have the abovementioned meaning,
q is 1 and
m is from 1 to 4,
or there is added at least one pigment dispersing agent of the formula (I) containing variants of the abovementioned radical X in one molecule.

4. The process as claimed in claim 2, wherein Me is a cooper atom.

5. The process as claimed in claim 1, wherein a grinding medium of diameter 0.2 to 1.0 mm is used.

6. The process as claimed in claim 1, wherein a grinding medium of diameter 0.3 to 0.5 mm is used.

7. The process as claimed in claim 1, wherein the ratio of milling space to surface area of the milling space in the stirred ball mill is less than 0.15:1 ($dm^3$:$dm^2$).

8. The process as claimed in claim 1, wherein the pigment concentration in the mill base suspension is at most 40% by weight.

9. The process as claimed in claim 1, wherein the pigment concentration in the mill base suspension is 10 to 30% by weight.

10. The process as claimed in claim 1, wherein the pigment concentration in the mill base suspension is 10 to 20% by weight.

11. The process as claimed in claim 1, wherein wet milling is carried out in a neutral or in an alkaline pH range.

12. The process as claimed in claim 1, wherein the finishing treatment is carried out in a mixture of water and an alkanol.

13. The process as claimed in claim 1, wherein the finishing treatment is carried out in a mixture of water and a butanol.

14. The process as claimed in claim 1, wherein highly crystalline copper phthalocyanine crude pigments of the β phase are used which optionally still contain small amounts of carboxyl or sulfonyl groups.

15. The process as claimed in claim 1, wherein at least one compound of the formula (I) in which
X is a phthaloimidomethylene group of the formula (IIIh)

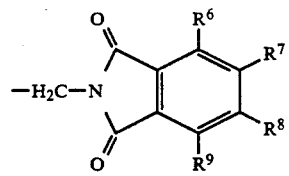

$R^6$, $R^7$, $R^8$, and $R^9$ being each a hydrogen atom and m being from 1 to 4, is used as the pigment dispersing agent.

16. The process as claimed in claim 1, wherein at least one compound of the formula (I) in which
X is an o-sulfobenzimidomethylene group of the formula (IIIi)

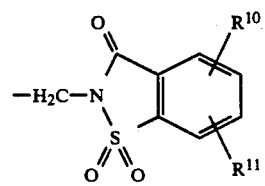

$R^{10}$ and $R^{11}$ being each a hydrogen atom and m being from 1 to 4, is used as the pigment dispersing agent.

17. The process as claimed in claim 1, wherein at least one compound of the formula (I) in which X is a group of the formula (IIIf)

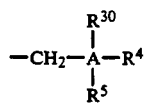

in which A is an imidazole, triazole or pyrazole radical and the heterocycle mentioned is bound to the methylene group via a carbon atom, $R^{30}$ and $R^4$ are a hydrogen atom, a methyl, ethyl or $C_2H_4OH$ group or in which $R^{30}$ and $R^4$ together form a phenyl radical, $R^5$ is a hydrogen atom, a $C_1$-$C_4$-alkyl, $C_1$-$C_3$-hydroxyalkyl or a $C_2$-$C_4$-alkenyl group and m is from 1 to 4, is used as the pigment dispersing agent.

18. The process as claimed in claim 1, wherein a mixture of different pigment dispersing agents of the formula (I) is used.

19. The process as claimed in claim 1, wherein the pigment dispersing agents of the formula (I) are present in amounts of 0.1 to 25% by weight, relative to the copper phthalocyanine pigment used.

20. The process as claimed in claim 1, wherein the pigment dispersing agents of the formula (I) are present in amounts of 0.1 to 15% by weight, relative to the copper phthalocyanine pigment used.

21. The process as claimed in claim 1, wherein the pigment dispersing agents of the formula (I) are present in amounts of 3 to 10% by weight, relative to the copper phthalocyanine pigment used.

22. A pigment preparation obtained by the process as claimed in claim 1.

23. A method of pigmenting a varnish, a printing ink or a plastic, comprising the step of incorporating a pigment preparation as claimed in claim 1 into said varnish, printing ink or plastic.

* * * * *

UNITED STATES PATENT AND TRADEMARK OFFICE
CERTIFICATE OF CORRECTION

PATENT NO.: 5,296,034

DATED: MARCH 22, 1994

INVENTOR(S): DEITZ ET AL

It is certified that error appears in the above-identified patent and that said Letters Patent is hereby corrected as shown below:

In claim 1, column 17, line 17, please insert --$\beta$-- prior to the word "phase".

In claim 4, column 22, line 9, "cooper atom" should read --copper atom--.

In claim 9, column 22, line 29, the term "30%" should read --35%--.

Signed and Sealed this

Second Day of August, 1994

Attest:

BRUCE LEHMAN

Attesting Officer   Commissioner of Patents and Trademarks